(12) United States Patent
Shakudo et al.

(10) Patent No.: US 11,262,222 B2
(45) Date of Patent: Mar. 1, 2022

(54) FLUID DEVICE AND PROGRAM FOR FLUID DEVICE

(71) Applicant: HORIBA STEC, Co., Ltd., Kyoto (JP)

(72) Inventors: Kazuya Shakudo, Kyoto (JP); Kentaro Nagai, Kyoto (JP); Kazuhiro Matsuura, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 91 days.

(21) Appl. No.: 16/215,947

(22) Filed: Dec. 11, 2018

(65) Prior Publication Data

US 2019/0178690 A1 Jun. 13, 2019

(30) Foreign Application Priority Data

Dec. 12, 2017 (JP) .............................. JP2017-238097

(51) Int. Cl.
*G01F 1/56* (2006.01)
*G05D 7/06* (2006.01)
(Continued)

(52) U.S. Cl.
CPC .............. *G01F 1/56* (2013.01); *G01F 15/046* (2013.01); *G05D 7/0658* (2013.01); *G01F 1/88* (2013.01); *G01F 25/0053* (2013.01)

(58) Field of Classification Search
CPC ...... G01F 1/56; G01F 15/046; G01F 25/0053; G01F 1/88; G05D 7/0658; G05D 7/0635
See application file for complete search history.

(56) References Cited

U.S. PATENT DOCUMENTS

2003/0226588 A1* 12/2003 Olander .................... F17C 5/00
    137/240
2005/0261842 A1* 11/2005 Yamagishi ............ G01F 1/6986
    702/45
(Continued)

FOREIGN PATENT DOCUMENTS

JP    57-158519 A    9/1982
JP    03-148711 A    6/1991
(Continued)

OTHER PUBLICATIONS

Japan Patent Office, Notice of Reasons for Refusal Issued in Application No. 2017-238097, dated Aug. 12, 2021, 9 pages.
(Continued)

*Primary Examiner* — Tejal Gami
(74) *Attorney, Agent, or Firm* — Alleman Hall Creasman & Tuttle LLP

(57) ABSTRACT

In order to provide a fluid device that makes it possible for operation command signals other than existing operation command signals to be received without a software modification having to be implemented in an already constructed system, in a fluid device that measures or controls physical quantities of a fluid, there are provided a command signal receiving unit that receives a predetermined plurality of types of operation command signals, and also command signal modes, which are values thereof or time series variations of the values thereof, and a command signal recognition unit that, when the command signal mode of a predetermined operation command signal received by the command signal receiving unit falls outside predetermined conditions that have been set in advance, recognizes the predetermined operation command signal that contains the command signal mode as being a different type of operation command signal.

12 Claims, 3 Drawing Sheets

(51) Int. Cl.
*G01F 15/04* (2006.01)
*G01F 25/00* (2022.01)
*G01F 1/88* (2006.01)

(56) References Cited

U.S. PATENT DOCUMENTS

| | | |
|---|---|---|
| 2010/0000608 A1 | 1/2010 | Goto et al. |
| 2014/0083159 A1* | 3/2014 | Nagai .................. G05D 7/0635 |
| | | 73/1.34 |

FOREIGN PATENT DOCUMENTS

| | | |
|---|---|---|
| JP | H03156509 A | 7/1991 |
| JP | 04262408 A | 9/1992 |
| JP | 10-122631 A | 5/1998 |
| JP | 2001124607 A | 5/2001 |
| JP | 2007087294 A | 4/2007 |
| JP | 2013178709 A | 9/2013 |
| WO | 2008016189 A1 | 2/2008 |

OTHER PUBLICATIONS

Japan Patent Office, Office Action Issued in Application No. 2017-238097, dated Dec. 21, 2021, 6 pages.

* cited by examiner

FLUID DEVICE AND PROGRAM FOR FLUID DEVICE

TECHNICAL FIELD

The present invention relates to a fluid device and to a program for a fluid device.

TECHNICAL BACKGROUND

A fluid device that measures a flow rate of a gas flowing along a flow path using a flow rate sensor, and then compares the resulting measurement values with predetermined calibration curve data so as to improve the flow rate measurement accuracy is disclosed, for example, in Patent Document 1 as a fluid device that is used in a semiconductor manufacturing process. Note that the calibration curve data differs for each type of gas, and if the type of gas flowing along a flow path is altered, then, naturally, it is necessary to reset the calibration curve data so as to match the new type of gas.

For this reason, in the fluid control device disclosed in the aforementioned Patent Document 1, it is assumed in advance that a user will alter the gas type, and a structure is employed in which the calibration curve data can be reset by inputting a calibration curve data setting signal via an interface.

On the other hand, there are also users who only need a low-cost fluid control device that does not include the above-described structure, and, conventionally, the needs of these users have been met by making it possible for the above-described structure to be added as an option to a fluid control device when so desired.

However, there have been cases when a user who did not add the above-described structure as an option at the time they purchased the fluid control device subsequently desired, after the purchase, to use a plurality of different gas types. In these cases, in order to operate the fluid control device, it is necessary to implement software modifications in order for the above-described structure to be added to the gas control system constructed by the user. Moreover, the problems have arisen that, while these software modifications are being implemented, it is necessary for the fluid control device to which the gas control system is connected to be stopped, and if the software modification fails, then this has, on occasion, caused massive damage to the system. Note that these problems are not limited to the calibration curve data setting signal, and the same may be said when implementing settings to receive other operation command signals.

DOCUMENTS OF THE PRIOR ART

Patent Documents

Patent document 1 Japanese Unexamined Patent Application (JP-A) No. H3-156509

DISCLOSURE OF THE INVENTION

Problems to be Solved by the Invention

It is, therefore, a principal object of the present invention to provide a fluid device that makes it possible for operation command signals other than existing operation command signals to be received without a software modification having to be implemented in an already constructed system.

Means for Solving the Problem

Namely, a fluid device according to the present invention is characterized in that, in a fluid device that measures or controls physical quantities of a fluid, there are provided a command signal receiving unit that receives a predetermined plurality of types of operation command signals, and also command signal modes, which are values thereof or time series variations of the values thereof, and a command signal recognition unit that, when the command signal mode of a predetermined operation command signal received by the command signal receiving unit falls outside predetermined conditions that have been set in advance, recognizes the predetermined operation command signal that contains the command signal mode as being a different type of operation command signal.

By employing this type of structure, in a fluid device, it is possible to set different operation command signals for conditions that are normally used as the command signal mode of the operation command signal (i.e., the operation command signal falls within predetermined conditions), and for conditions that are not normally used as the command signal mode of the operation command signal (i.e., the operation command signal falls outside predetermined conditions). As a result, it is possible for conditions that are not normally used as the command signal mode of an operation command signal to be used as a different type of operation command signal, and by setting as this different type of operation command signal an operation command signal whose use by a user is predicted in advance, it is possible, without having to implement software modifications in an existing system, to input a different type of operation command signal using a predetermined operation command signal.

Note that the operation command signals instruct a fluid device to perform various types of operations, while the command signal mode shows the extent and sequence and the like of these various types of operations. More specifically, for example, an operation command signal may be set as a function instructing that the aforementioned various types of operations be performed, while the command signal mode may be set as a parameter that is dependent on the function and shows the extent and sequence and the like of the various types of operations. Additionally, each command signal includes an operation command signal and the command signal aspect that is associated with that operation command signal.

Moreover, in the above-described fluid device, when the command signal mode of the predetermined operation command signal belongs to previously determined specified conditions that are outside the predetermined conditions, then it is possible for the command signal recognition device to recognize the command signal mode of the predetermined operation command signal as the different type of operation command signal. In this case, there are a plurality of the specified conditions, and there are further provided an associated mode data storage unit that stores associated mode data in which a different command signal mode is associated with each of the specified conditions, and a command signal mode allocation unit that refers to the specified condition to which the command signal mode of the predetermined operation command signal belongs, and selects the command signal mode that corresponds to the relevant specified conditions from among the associated mode data, and allocates the selected command signal mode to the different type of operation command signal.

By employing this type of structure, it is possible to further differentiate into each of the specified conditions modes that are contained in conditions that are not normally used as a command signal mode of a predetermined operation command signal (i.e., that are outside the predetermined conditions). As a result, it becomes possible to set a different command signal mode for each mode that belongs to different specified conditions as the command signal mode of a predetermined operation command signal.

Note that the predetermined operation command signal and the different type of operation command signal may relate to the measurement or control of physical quantities of a fluid.

More specifically, as the predetermined operation command signal, in a fluid device that is further equipped with a fluid control valve that controls a fluid flowing along a flow path, it is also possible for the predetermined operation command signal to be an opening/closing signal for the fluid control valve. Furthermore, in a fluid device that is further equipped with a measurement mechanism that measures any one of a flow rate, pressure, and concentration of a fluid flowing along the flow path, a target value setting unit that sets in advance a target value for a measurement value that is measured by the measurement mechanism, and a valve control unit that controls an opening angle of the fluid control valve such that the measurement value measured by the measurement mechanism approximates the target value, it is also possible for the predetermined operation command signal to be the setting signal for the target value. Additionally, in a fluid device that is further equipped with a flow rate range setting unit that sets in advance a flow rate range that is capable of being controlled by the fluid control valve, it is also possible for the predetermined operation command signal to be the setting signal for the flow rate range.

Note that examples of the opening/closing signal for the fluid control valve include an opening/closing sequence and opening/closing timings and the like. More specifically, an opening/closing signal in which the opening signal and the closing signal are switched at a speed that is not normally used, and an opening/closing signal in which the opening signal and the closing signal are input simultaneously may be considered.

Moreover, as the different type of operation command signal, more specifically, in a fluid device that is further equipped with a calibration curve storage unit that stores a plurality of calibration curve data corresponding to the fluid types, and a calibration curve data setting unit that corrects actually measured values measured by the measurement mechanism contained in the plurality of calibration curve data stored in the calibration curve storage unit and determines in advance calibration curve data to be used to calculate the measurement values, it is also possible for the different type of operation command signal to be a setting signal for the calibration curve data. Moreover, in a fluid device that is further equipped with a display unit that displays measurement values measured by the measurement mechanism, and a scale setting unit that sets in advance a scale that is used when the measurement values are displayed on the display unit, it is also possible for the different type of operation command signal to be a setting signal for the scale. Additionally, in a fluid device in which the measurement mechanism is provided with a pressure measurement mechanism that measures a pressure of the fluid, and a flow rate measurement mechanism that measures a flow rate of the fluid, and that is further equipped with a control method switching unit that switches the control method used to control the fluid in the fluid device from one of a pressure control method in which the fluid is controlled based on pressure values measured by the pressure measurement mechanism or a flow rate control method in which the fluid is controlled based on flow rate values measured by the flow rate measurement mechanism to another of the pressure control method or the flow rate control method, it is also possible for the different type of operation command signal to be a switching signal for the control method.

Moreover, a program for a fluid device according to the present invention is a program for a fluid device that is used in a fluid device that measures or controls physical quantities of a fluid, and that causes a computer to perform functions of receiving a predetermined plurality of types of operation command signals, and also command signal modes, which are values thereof or time series variations of the values thereof, and when the command signal mode of a received predetermined operation command signal falls outside predetermined conditions that have been set in advance, of recognizing the predetermined operation command signal that contains the command signal mode as being a different type of operation command signal.

Effects of the Invention

According to the fluid device according to the present invention which is formed in the above-described manner, it is possible to instruct that a different system operation be performed using an existing predetermined system operation instruction without a software modification having to be implemented in an already constructed system.

BEST EMBODIMENTS FOR IMPLEMENTING THE INVENTION

Hereinafter, a fluid device according to the present invention will be described based on the drawings.

A fluid device according to the present invention may be, for example, a fluid measurement device that is used to measure material gases (i.e., fluids) that are supplied to a film formation chamber and the like during a semiconductor manufacturing process, or a fluid control device that is used to control supply quantities of these material gases that are supplied to the film formation chamber and the like. Note that in Embodiment 1, a fluid control device and a gas control system in which that fluid control device is incorporated are described.

Embodiment 1

Figure 1:
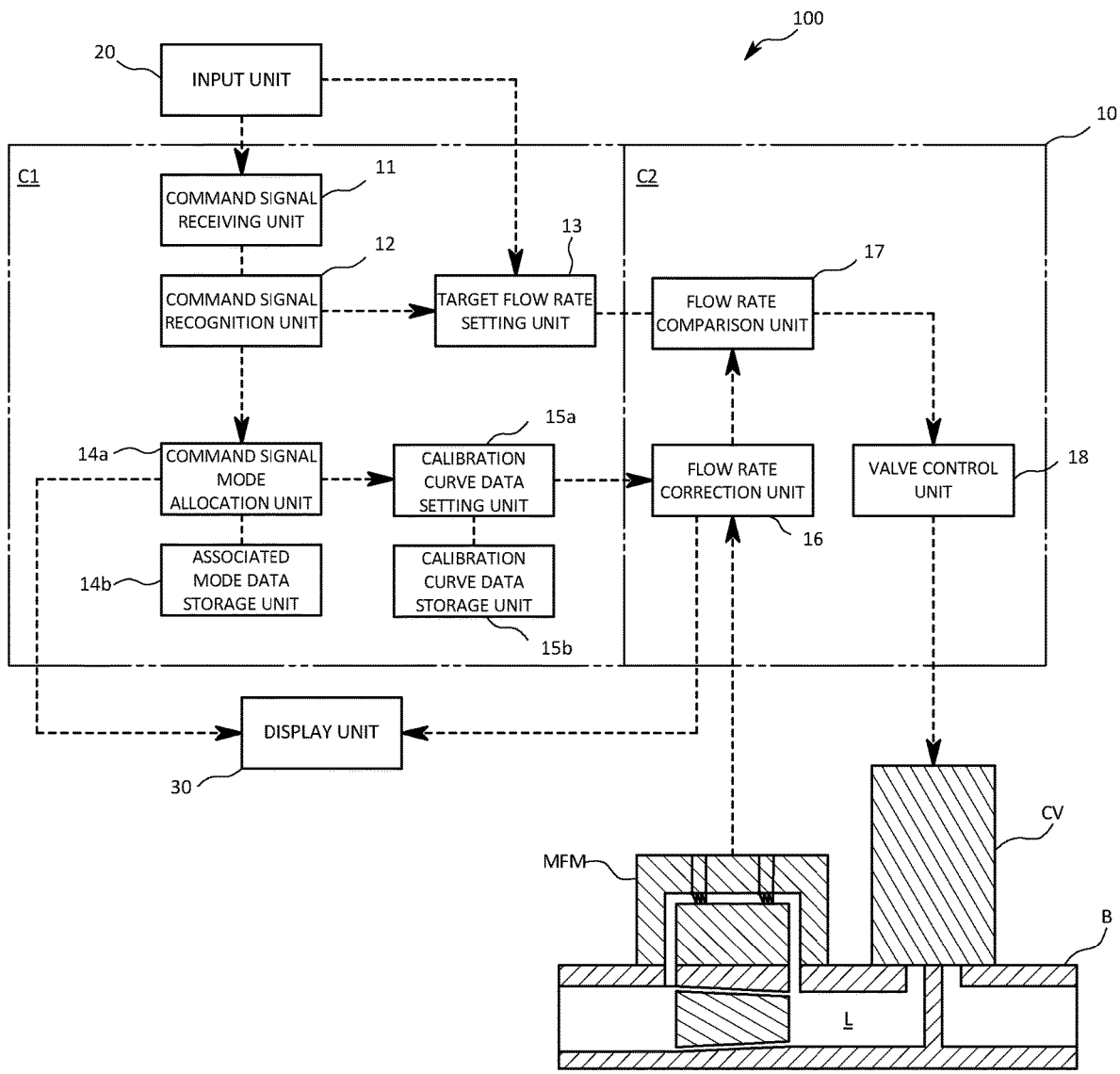
FIG. 1 is a typical view showing a fluid control device according to an embodiment of the present invention.

A fluid control device 100 according to the present embodiment is what is known as a mass flow controller, and this fluid control device 100 according to the present embodiment is a thermal mass flow controller. More specifically, as is shown in FIG. 1, the fluid control device 100 is provided with a main block B that is provided with an internal flow path L along which a fluid flows, a flow rate sensor MFM that is connected to the main block B and measures a flow rate of a fluid flowing along the flow path L, and a fluid control valve CV that is connected to the main block B and controls the flow rate of the fluid flowing along the flow path L. Note that the flow rate sensor MFM corresponds to the measurement mechanism described in the Claims.

Figure 2:
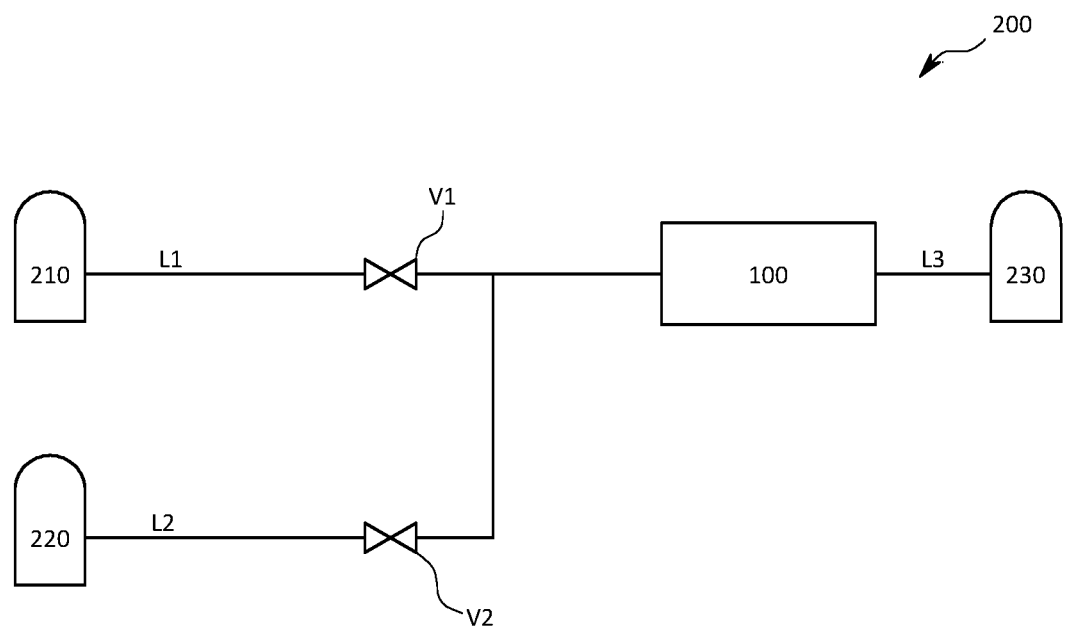
FIG. 2 is a typical view showing a gas control system in which the fluid control device according to an embodiment of the present invention is incorporated.

The fluid control device 100 is used, for example, by being incorporated into a gas control system 200 shown in FIG. 2. The gas control system 200 is provided with the fluid control device 100, a first introduction line L1 that introduces processing gas to the fluid control device 100, a second introduction line L2 that merges with the first introduction line L1 and introduces a test gas to the fluid control device 100, and an extraction line L3 that extracts gas from the fluid control device 100 at a flow rate that is controlled so as to approximate a target flow rate that has been set in advance.

An end on the upstream side of the first introduction line L1 is connected to a processing gas supply device 210, and a first opening/closing valve V1 is provided partway along the first introduction line L1. Additionally, an end on the upstream side of the second introduction line L2 is connected to a test gas supply device 220, and a second opening/closing valve V2 is provided partway along the second introduction line L2. Note that the second introduction line L2 merges with the first introduction line L1 on the downstream side of the first opening/closing valve V1. Moreover, an end on the downstream side of the extraction line L3 is connected to a film formation chamber 230 which is the gas supply destination.

The gas control system 200 is formed so as to enable either processing gas or test gas to be introduced into the fluid control device 100 by controlling the first opening/closing valve V1 and the second opening/closing valve V2.

The fluid control device 100 is further provided with an information processing device 10. Note that the flow rate sensor MFM and the flow body control valve CV are connected to the information processing device 10. The information processing device 10 has what is known as a microcomputer that is provided with a CPU, memory, and A/D-D/A converters and the like. When a program stored in the memory is executed, the various devices operate in mutual collaboration and perform various functions. Additionally, the information processing device 10 is further connected to an input unit 20 that is able to input various types of information, and a display unit 30 that is able to display various types of information.

The information processing device 10 is provided with a first control unit C1 and a second control unit C2. The first control unit C1 sets target flow rate values for the measurement flow rate values measured by the flow rate sensor MFM, or calibration curve data corresponding to the types of gas measured by the flow rate sensor MFM. Here, the target flow rate values are values for the flow rates that are to be attained on the flow path L by the fluid control device 100. Moreover, the calibration curve data is data showing, for example, a relationship between values when a known flow rate has been attained on the flow path L, and measured flow rate values measured by the flow rate sensor MFM in that state. Based on the calibration curve data set by the first control unit C1, the second control unit C2 performs control such that the measurement flow rate values obtained by correcting the actual measurement values measured by the flow rate sensor MFM approximate the target flow rate values set by the first control unit C1. More specifically, the first control unit C1 is provided with a command signal receiving unit 11, a command signal recognition unit 12, a target flow rate setting unit 13, a command signal mode allocation unit 14a, an associated mode data storage unit 14b, a calibration curve data setting unit 15a, and a calibration curve data storage unit 15b. Furthermore, the second control unit C2 is provided with a flow rate correction unit 16, a flow rate comparison unit 17, and a valve control unit 8. Note that the second control unit C2 corresponds to the fluid control unit described in the Claims.

The first control unit C1 will now be described in more detail. The command signal receiving unit 11 receives a target flow rate value setting signal input from the input unit 20 as well as the input flow rate value thereof. Not that the target flow rate value setting signal corresponds to the predetermined operation command signals described in the Claims, while the input flow rate value corresponds to the command signal modes described in the Claims.

The command signal recognition unit 12 determines whether or not an input flow rate value in the setting signal received by the command signal receiving unit 11 falls outside a predetermined range (i.e., predetermined conditions) that has been set in advance. More specifically, if the command signal recognition unit 12 determines that an input flow rate value does not fall outside a predetermined range, then it recognizes the setting signal that contains the input flow rate value in that state as being a target flow rate value setting signal. If, on the other hand, the command signal recognition unit 12 determines that an input flow rate value does fall outside a predetermined range, then it recognizes the setting signal that contains the input flow rate value as being a calibration curve data setting signal. Note that this calibration curve data setting signal corresponds to the different type of operation command signal described in the Claims. Note also that the command signal mode may be a value such as the input flow rate value of the present embodiment, or may be a time series variation of that value.

When a target flow rate value setting signal has been recognized by the command signal recognition unit 12, the target flow rate value setting unit 13 resets the target flow rate value of a fluid extracted from the fluid control device 100 to the extraction line L3 to the input flow rate value of the setting signal. Note that an initial value of the target flow rate value set in the target flow rate value setting unit 13 is set in advance by a user via the input unit 20. Note also that the target flow rate value corresponds to the target value described in the Claims.

The command signal mode allocation unit 14a determines whether or not an input flow rate value of a setting signal that has been determined by the command signal recognition unit 12 to fall outside the predetermined range belongs to at least one specified range (i.e., belongs to specified conditions) outside that predetermined range. More specifically, the command signal mode allocation unit 14a establishes two specified ranges, namely, an overly large specified range in which the target flow rate values that are outside the predetermined range are excessively large, and an overly small specified range in which the target flow rate values that are outside the predetermined range are excessively small. The command signal mode allocation unit 14a determines whether or not an input flow rate value of a setting signal belongs to the overly large specified range, and if it is determined that the input flow rate value of a setting signal does belong to the overly large specified range, the command signal mode allocation unit 14a selects a command signal mode that corresponds to that overly large specified range from among associated mode data (described below), and allocates the relevant command signal mode that it has selected to a calibration curve data setting signal. If, on the other hand, it is determined that the input flow rate value of a setting signal belongs to the overly small specified range, the command signal mode allocation unit 14a selects a command signal mode that corresponds to that overly small specified range from among associated mode data (described below), and allocates the relevant command signal mode that it has selected to a calibration curve data setting signal. It should be noted that if the command signal mode allocation unit 14a determines that the target flow rate value of the setting signal does not belong to either the overly large specified range or the overly small specified range, then an error is displayed on the display unit and the operation is ended.

The associated mode data storage unit 14b stores associated mode data in which a different command signal mode is associated with each specified range. More specifically, in the associated mode data, calibration curve data for a processing gas is associated with the overly large specified range, while calibration curve data for a test gas is associated with the overly small specified range.

The calibration curve data setting unit 15a sets one set of calibration curve data that has been selected from the calibration curve data (described below) as the calibration curve data to be used to correct the measurement flow rate values measured by the flow rate sensor MFM. Note that if it is determined in the command signal mode allocation unit 14a that an input flow rate value of a setting signal belongs to the overly large specified range, then the calibration curve data setting unit 15a sets the calibration curve data for a processing gas, while if it is determined in the command signal mode allocation unit 14a that an input flow rate value of a setting signal belongs to the overly small specified range, then the calibration curve data setting unit 15a sets the calibration curve data for a test gas.

The calibration curve data storage unit 15b stores calibration curve data for a plurality of types of gas that have been measured in advance, and calibration curve data for at least the plurality of types of gas that are to be controlled is stored therein. Accordingly, calibration curve data for a processing gas and calibration curve data for a test gas are stored in the calibration curve data storage unit 15b of the present embodiment.

The second control unit C2 will now be described in detail. The flow rate correction unit 16 corrects measurement values measured by the flow rate sensor MFM using calibration curve data set in a calibration curve setting unit 12a, and calculates measurement flow rate values. Note that the measurement flow rate values correspond to the measurement values described in the Claims.

The flow rate comparison unit 17 compares measurement flow rate values calculated by the flow rate correction unit 16 with target flow rate values stored in the target flow rate setting unit 13, and calculates a deviation between them. Additionally, the valve control unit 18 performs feedback control on the opening angle of the fluid control valve CV based on the deviation calculated by the flow rate comparison unit 7.

Figure 3:
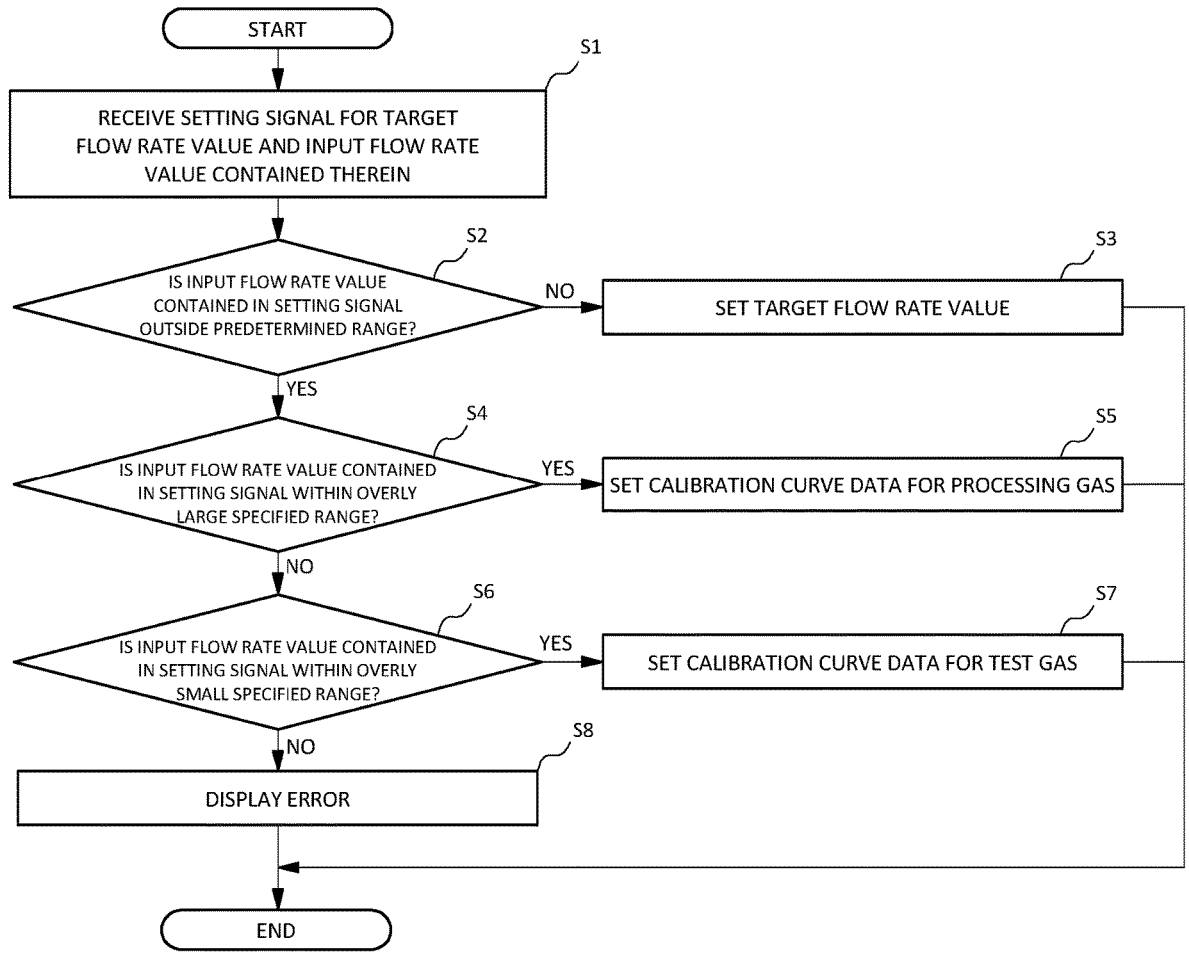
FIG. 3 is a flowchart showing an operation of the fluid control device according to an embodiment of the present invention.

Next, an operation of the gas control system 200 according to the present embodiment will be described based on FIG. 3.

When a new target flow rate value is input into the gas control system 200 via the input unit 20, firstly, the command signal receiving unit 11 receives the target flow rate value setting signal and the input flow rate value thereof (step S1).

Next, the command signal recognition unit 12 determines whether or not the input flow rate value associated with the setting signal falls outside the predetermined range (step S2). If the command signal recognition unit 12 determines that the input flow rate value associated with the setting signal does not fall outside the predetermined range, the target flow rate setting unit 13 resets a target flow rate value that has been set in advance as the input flow rate value associated with the setting signal, and the operation is ended (step S3). If, on the other hand, the command signal recognition unit 12 determines that the input flow rate value associated with the setting signal does fall outside the predetermined range, then the command signal recognition unit 12 recognizes the setting signal of the target flow rate value that contains this input flow rate value as the setting signal of the calibration curve data.

When the command signal recognition unit 12 has recognized the target flow rate value setting signal as a calibration curve data setting signal, the command signal mode allocation unit 14a then determines whether or not the input flow rate value associated with the setting signal belongs to the overly large specified range (step S4). If the command signal mode allocation unit 14a determines that the target flow rate value associated with the setting signal does belong to the overly large specified range, then the calibration curve data setting unit 15a resets calibration curve data that has been set in advance as the calibration curve data for the processing gas, and then ends the operation (step S5). If, on the other hand, the command signal mode allocation unit 14a determines that the target flow rate value associated with the setting signal does not belong to the overly large specified range, it then determines whether or not it belongs to the overly small specified range (step S6).

If the command signal mode allocation unit 14a determines that the target flow rate value associated with the setting signal does belong to the overly small specified range, the calibration curve data setting unit 15a resets calibration curve data that has been set in advance as the calibration curve data for the test gas, and then ends the operation (step S7). If, on the other hand, the command signal mode allocation unit 14a determines that the target flow rate value associated with the setting signal does not belong to the overly small specified range, an error symbol is displayed on the display unit 30, and the operation is ended (step S8).

The fluid control device 100 uses the second control unit C2 to calculate a measurement flow rate value by correcting measurement values measured by the flow rate sensor MFM based on calibration curve data set by the first control unit C1, and performs feedback control such that this measurement flow rate value approximates the target flow rate value set by the first control unit C1.

By employing this type of structure, in the gas control system 200, when the first opening/closing valve and the second opening/closing valve V2 are controlled so that processing gas is introduced from the first introduction line L1 into the fluid control device 100, if a value belonging to the overly large specified range is input into the fluid control device 100 as the target flow rate value of a setting signal, then the calibration curve data setting unit 15a is able to reset the calibration curve data to calibration curve data for a processing gas by performing the above-described operation. Moreover, in the gas control system 200, when the first opening/closing valve and the second opening/closing valve V2 are controlled so that test gas is introduced from the second introduction line L2 into the fluid control device 100, if a value belonging to the overly small specified range is input into the fluid control device 100 as the target flow rate value of a setting signal, then the calibration curve data setting unit 15a is able to reset the calibration curve data to calibration curve data for a test gas by performing the above-described operation. In this way, if settings are implemented in advance in the fluid control device 100 that enable a portion of the setting signal of a target flow rate value to be used as a setting signal for calibration curve data, then it is possible for a setting signal for calibration curve data to be received without any software modifications needing to be made to the software performing the overall control of the gas control system 200.

Additional Embodiments

Instead of the setting signal for a target flow rate value that is received by the command signal receiving unit 11 in the above-described embodiment, it is also possible, for example, for an opening/closing signal for the fluid control valve to be used. Note that examples of a command signal mode for an opening/closing signal include time series variations in the opening and closing such as the opening/closing sequence and the opening/closing timings. Additionally, examples of a command signal mode of an opening/closing signal that falls outside the predetermined range include time series variations in the opening and closing that are not normally used such as a mode in which opening and closing are repeated at high speed, and a mode in which opening and closing are performed simultaneously.

Moreover, instead of the setting signal for a target flow rate value that is received by the command signal receiving unit 11 in the above-described embodiment, it is possible, for example, to provide a flow rate range setting unit that sets in advance a flow rate range that is capable of being controlled by the fluid control device 100, and to use a setting signal of this flow rate range.

Furthermore, in the fluid control device 100 of the present embodiment, a fluid is controlled based on measurement flow rate values measured by the flow rate sensor MFM, however, it is also possible for a fluid to be controlled based on measurement values measured by a pressure sensor or a density sensor. In this case, instead of the setting signal for a target flow rate value that is received by the command signal receiving unit 11 in the above-described embodiment, it is possible for setting signals for target values of these to be used. Note that an example of a density sensor is an absorption photometer.

In addition, instead of the setting signal for calibration curve data in the above-described embodiment, it is possible to provide a scale setting unit that sets in advance a scale for when measurement flow rate values measured by the flow rate sensor MFM are displayed on a display unit, and to use a setting signal of this scale.

Furthermore, the present invention is not limited to thermal mass flow controllers, and can also be used with pressure mass flow controllers. Note that some mass flow controllers are provided with two or more sensors selected from pressure sensors, flow rate sensors, and position sensors that directly or indirectly measure the position of a valve body relative to a valve seat in a fluid control valve. If a mass flow controller of this type is used, then this mass flow controller can be used to form a pressure control system in which the fluid control valve is controlled such that a measurement pressure value measured by the pressure sensor approximates a target pressure value, and can also be used to form a flow rate control system in which the fluid control valve is controlled such that a measurement flow rate value measured by the flow rate sensor approximates a target flow rate value, and can also be used to form a position control system in which the fluid control valve is controlled such that the position of the valve body measured by the position sensor approximates a target position. It is also possible to provide a control system switching unit that is able to switch between these control systems, and to use this control system switching unit instead of the setting signal of the calibration curve data of the above-described embodiment. Note that if the fluid control valve has a structure in which, for example, the valve body is moved by a piezo element, then the position of the valve body may be measured indirectly from the position of the piezo element, or the position of the valve body may be measured directly.

Note that the present invention can be used not only in the fluid control device 100 of the above-described embodiment, but also in a fluid measurement device in which the fluid control valve CV has been removed from the fluid control device 100. In this case, the setting signal of the flow rate range may be used as the predetermined operation command signal, while the setting signal of the calibration curve data or the setting signal of the scale or the like may be used as the different type of operation command signal.

Additionally, it is also possible for there to be a plurality of the specified conditions, and for there to be provided an associated signal data storage unit that stores associated signal data in which a different one of the different types of operation command signal is associated with each of the specified ranges, and for the command signal recognition unit to refer to the specified range to which the command signal mode of the predetermined operation command signal belongs, and select the different type of operation command signal that corresponds to the relevant specified range from among the associated signal data, and recognize the selected different type of operation command signal.

Furthermore, it should be understood that the present invention is not limited to each of the above-described embodiments, and that various modifications and the like may be made thereto insofar as they do not depart from the spirit or scope of the present invention.

DESCRIPTION OF THE REFERENCE CHARACTERS

100 . . . Fluid control device
B . . . Main block
MFM . . . Flow rate sensor
CV . . . Flow rate control valve
10 . . . Information processing device
C1 . . . Command signal control unit
C2 . . . Fluid control unit
11 . . . Command signal receiving unit
12 . . . Command signal recognition unit
13 . . . Target flow rate setting unit
14a . . . Command signal mode allocation unit
14b . . . Associated mode data storage unit
15a . . . Calibration curve data setting unit
15b . . . Calibration curve data storage unit
18 . . . Valve control unit
200 . . . Gas control system
L1 . . . First introduction line
L2 . . . Second introduction line
L3 . . . Extraction line
V1 . . . First opening/closing valve
V2 . . . Second opening/closing valve

What is claimed is:

1. A fluid device that measures or controls physical quantities of a fluid, comprising:
   an input unit configured to receive input information from a user;
   a command signal receiving unit that receives a predetermined operation command signal from the input unit, and also user-inputted command signal modes, which are user-inputted values thereof or user-inputted time series variations of the values thereof; and
   a command signal recognition unit that,
      when values of the user-inputted command signal mode of the predetermined operation command signal received by the command signal receiving unit fall within a first range that is used for measurement or control and has been set in advance, recognizes the predetermined operation command signal that contains the user-inputted command signal mode as being a first type of operation command signal and causes the fluid device to perform a first type of operation; and
      when values of the user-inputted command signal mode of the predetermined operation command signal received by the command signal receiving unit fall within a second range that has been set in advance, recognizes the predetermined operation command signal that contains the user-inputted command signal mode as being a second type of operation command signal and causes the fluid device to perform a second type of operation, wherein
   the second range is smaller or larger than the first range, and
   the values falling within the second range are not used for measurement or control.

2. The fluid device according to claim 1, wherein, when the values of the user-inputted command signal mode of the predetermined operation command signal belong to a previously determined specified range that is within the second range and outside of the first range, then the command signal recognition unit recognizes the user-inputted command signal mode of the predetermined operation command signal as the second type of operation command signal.

3. The fluid device according to claim 2, wherein there are the second range and a third range that are outside of the first range, and there are further provided:
   an associated mode data storage unit that stores associated mode data in which a different command signal mode is associated with each of the second range and the third range; and
   a command signal mode allocation unit that, on a basis of the associated mode data, determines the second range or the third range to which the user-inputted command signal mode of the predetermined operation command signal belongs, and, on a basis of a result of determination, allocates the predetermined operation command signal to the second type of operation command signal or a third type of operation command signal.

4. The fluid device according to claim 1, wherein the first type of operation command signal and the second type of operation command signal relate to measurements or control of physical quantities of the fluid.

5. The fluid device according to claim 4, wherein there is further provided a fluid control valve that controls a fluid flowing along a flow path, and
   the first type of operation command signal is an opening/closing signal for the fluid control valve.

6. The fluid device according to claim 4, wherein there are further provided:
   a fluid control valve that controls a fluid flowing along a flow path,
   a measurement mechanism that measures any one of a flow rate, pressure, and concentration of the fluid flowing along the flow path;
   a target value setting unit that sets in advance a target value for a measurement value that is measured by the measurement mechanism; and
   a fluid control unit that controls an opening of the fluid control valve such that the measurement value measured by the measurement mechanism approximates the target value, wherein
   the first type of operation command signal is a setting signal for the target value.

7. The fluid device according to claim 4, wherein there is further provided a fluid control valve that controls a fluid flowing along a flow path, and a flow rate range setting unit that sets in advance a flow rate range that is capable of being controlled by the fluid control valve, wherein
   the first type of operation command signal is a setting signal for the flow rate range.

8. The fluid device according to claim 4, wherein there are further provided:
   a calibration curve storage unit that stores a plurality of calibration curve data corresponding to fluid types; and
   a calibration curve data setting unit that corrects actually measured values measured by a measurement mechanism contained in the plurality of calibration curve data stored in the calibration curve storage unit and determines in advance calibration curve data to be used to calculate measurement values, wherein
   the second type of operation command signal is a setting signal for the calibration curve data.

9. The fluid device according to claim 4, wherein there are further provided:
   a display unit that displays measurement values measured by a measurement mechanism; and
   a scale setting unit that sets in advance a scale that is used when the measurement values are displayed on the display unit, wherein
   the second type of operation command signal is a setting signal for the scale.

10. The fluid device according to claim 4, wherein
   a fluid control valve that controls a fluid flowing along a flow path,
   a measurement mechanism is provided with two or more mechanisms selected from a pressure measurement mechanism that measures a pressure of the fluid, a flow rate measurement mechanism that measures a flow rate of the fluid, and a position measurement mechanism that directly or indirectly measures a position of a valve body relative to a valve seat of the fluid control valve, and wherein
   there is further provided a control method switching unit that switches a control method used to control the fluid in the fluid device to any one of a pressure control method in which the fluid is controlled based on pressure values measured by the pressure measurement mechanism, a flow rate control method in which the fluid is controlled based on flow rate values measured by the flow rate measurement mechanism, or a position control method in which the fluid is controlled based on a position measured by the position measurement mechanism, and wherein the second type of operation command signal is a switching signal for the control method.

11. A non-transitory program recording media stored a program for a fluid device that is used in the fluid device that measures or controls physical quantities of a fluid, and that causes a computer to perform functions of:

receiving user input information from a user via an input unit;

receiving a predetermined operation command signal from the input unit, and also user-inputted command signal modes, which are user-inputted values thereof or user-inputted time series variations of the values thereof, and, when values of the user-inputted command signal mode of a received predetermined operation command signal fall within a first range that is used for measurement or control and has been set in advance, recognizing the predetermined operation command signal that contains the user-inputted command signal mode as being a first type of operation command signal and causing the fluid device to perform a first type of operation; and when values of the user-inputted command signal mode of the received predetermined operation command signal fall within a second range that has been set in advance, recognizing the predetermined operation command signal that contains the user-inputted command signal mode as being a second type of operation command signal and causing the fluid device to perform a second type of operation, wherein the second range is smaller or larger than the first range, and the values falling within the second range are not used for measurement or control.

12. The fluid device according to claim 1, wherein the first type of operation command signal is a setting signal for target flow rate data; and the second type of operation command signal is a setting signal for calibration curve data.

* * * * *